United States Patent [19]

Shinya

[11] Patent Number: 5,442,574

[45] Date of Patent: Aug. 15, 1995

[54] METHOD AND APPARATUS FOR DETERMINING A BASE LINE OF A MEASUREMENT

[75] Inventor: Kazunari Shinya, Takatsuki, Japan

[73] Assignee: Shimadzu Corporation, Kyoto, Japan

[21] Appl. No.: 28,930

[22] Filed: Mar. 8, 1993

[30] Foreign Application Priority Data

Mar. 24, 1992 [JP]   Japan .................................. 4-97191

[51] Int. Cl.⁶ .......................... G01C 3/00; G01F 23/00
[52] U.S. Cl. ................ 364/571.01; 364/498; 364/487; 364/571.02
[58] Field of Search ............... 364/498, 564, 485, 474, 364/496, 497; 73/23.21, 23.23; 33/121, 123, 124, 562, 565; 395/142; 340/728, 748

[56] References Cited

U.S. PATENT DOCUMENTS 5,119,316  6/1992  Dam et al. ................... 364/498 O R
5,121,443  6/1992  Tomlinson ..................... 364/498 X

OTHER PUBLICATIONS

Chu et al., "Impulsive Noise Suppression and Background Normalization of Electrocardiogram Signals Using Morphological Operators", Feb. 1989, pp. 262-273. IEEE Trans. on B.E.; vol. 36, No. 2.
Wilson et al., "Morphological Enhancement of Coronary Angiograms", 1991, IEEE pp. 313-316.

Primary Examiner—Edward R. Cosimano
Assistant Examiner—Kamini Sanjiv Shah
Attorney, Agent, or Firm—Oliff & Berridge

[57] ABSTRACT

A method and apparatus for determining a base line of a measurement curve wherein after preparing a template having an arc upward convex, a CPU of the data processing system moves, without rotating, the template with the arc of the template always contacting the measurement curve and determines the base line as the envelope of the arc of the template. During moving of the template, the system may move the template horizontally under the measurement curve; calculate, at every horizontal point at a given horizontal position of the template, the vertical distance between the arc of the template and the arc of the measurement curve; detect the minimum of the vertical distance at the given horizontal position of the template; and move the template vertically at the given horizontal position by the minimum vertical distance. To determine the base line, the CPU initializes data of the base line by the smallest value and judges whether the arc of the template after moved is superior to the arc before moved at every point of the arc after moved. The data of the base line is updated at the points where the arc after moved is superior to the are before moved by the data of the arc after moved.

10 Claims, 6 Drawing Sheets

METHOD AND APPARATUS FOR DETERMINING A BASE LINE OF A MEASUREMENT

The present invention relates to a method and apparatus for determining a base line of a data curve recorded through a measurement.

BACKGROUND OF THE INVENTION

When data from a measurement apparatus, such as a chromatograph or spectrometer, is continuously plotted against time, wavelength, etc., a measurement curve including a peak or peaks is obtained. Due to various factors, the base line of a measurement curve often deviates from the zero line of the measurement apparatus or the recorder. In this case, it is necessary to determine the base line first to measure the true height (or to measure the area) of the peak or peaks. Determining the base line is especially difficult when, as shown in FIG. 1, the base line B of a measurement curve C (on which the peak or peaks P1, P2 stand) curves.

A conventional method of determining a base line is as follows. First a peak is detected by detecting the rising point and the falling point at which the absolute value of the slope of the measurement curve becomes greater than a certain reference value and becomes less than another reference value. The starting point of the peak is determined as the point which is a preset distance before the rising point, and the ending point of the peak is determined as the point which is a preset distance after the falling point. The base line in this case is determined as the line connecting the starting point and the ending point.

There are several other methods of determining the base line of a peak, but, in any case, the starting point and the ending point of a peak should be determined first. In order to determine these points, the operator must determine various parameters beforehand such as the reference values for the slope of the rising point and of the falling point or the values of the preset distances. If the parameters are once determined, then the base line can be determined automatically. But many operators find difficulties in determining appropriate values for the various parameters because the values are not apparent from the measurement curve.

SUMMARY OF THE INVENTION

The method and apparatus of the present invention alleviate the operator's burden in determining the base line of a measurement curve, and provide an easier way of determining the base line. According to the present invention, a method of determining a base line of a measurement curve comprises the steps of, as shown in FIG. 1 and FIG. 3:

preparing a template T having an arc upward convex (step S1);

moving, without rotating, the template T with the arc of the template always contacting the measurement curve C (step S2); and determining the base line B as the envelope of the arc of the template T (step S3).

The present invention is also realized by a data processing apparatus comprising, as shown in FIG. 4:

measurement curve generating means M1;

template generating means M2 for generating a template T having an arc upward convex;

moving means M3 for moving, without rotating, the template T so that the arc of the template T always contacts the measurement curve C; and envelope generating means M4 for generating an envelope line of the arc of the template T while the template T is moved, whereby the envelope is the base line B of the measurement curve C.

Since the operator can prepare (or determine the shape of) the template T regarding the measurement curve C, and the determination of the shape of the template T need not be so strict, the operator's burden is largely alleviated. Respective steps and means cited above are detailed in the following description of the embodiment.

DETAILED DESCRIPTION OF A PREFERRED EMBODIMENT

Figure 3:
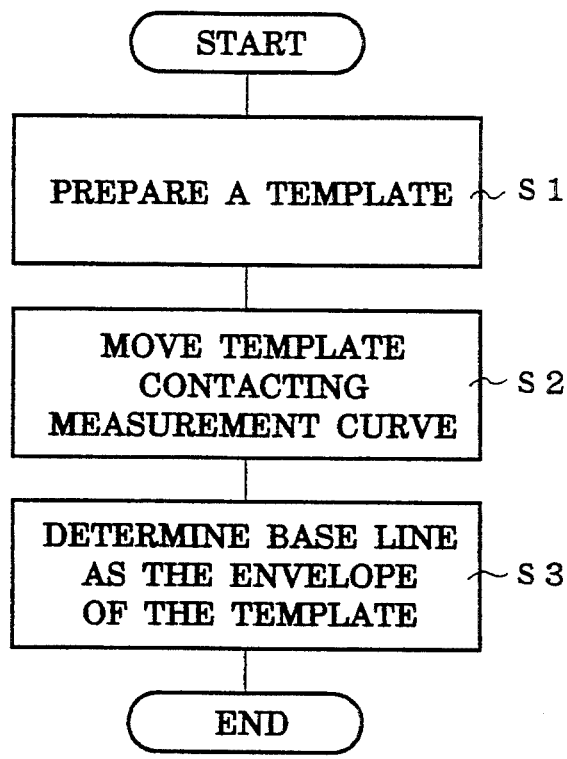
FIG. 3 is a flowchart of the base line determining method according to the present invention.
Figure 4:
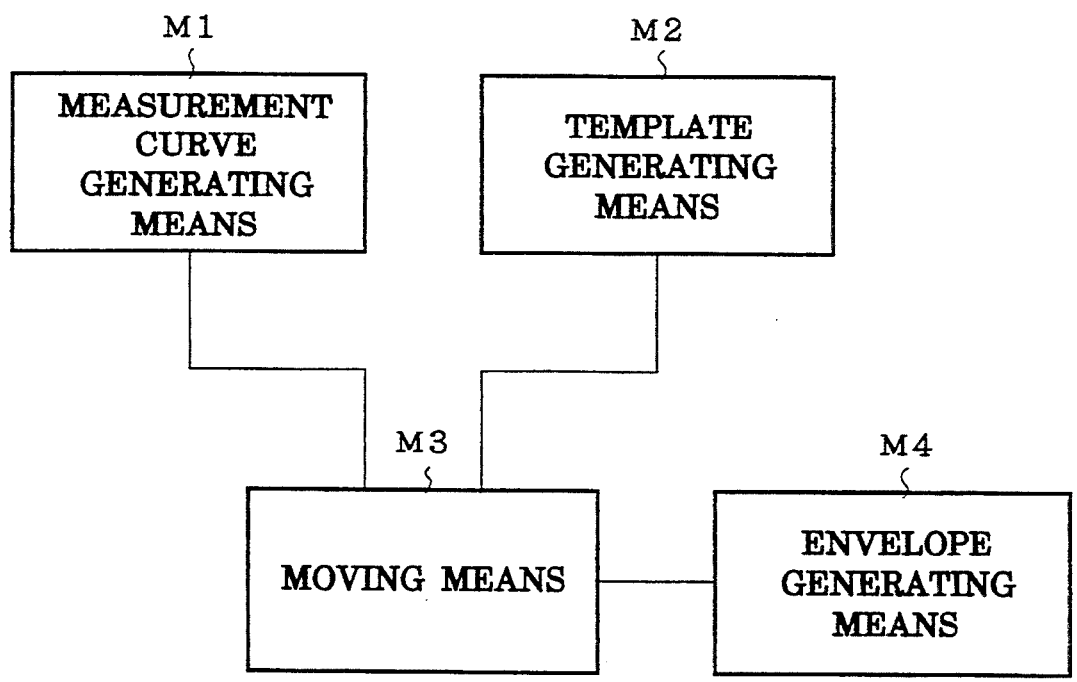
FIG. 4 is a block diagram of the data processing apparatus for determining a base line of a measurement curve according to the present invention.
Figure 5:
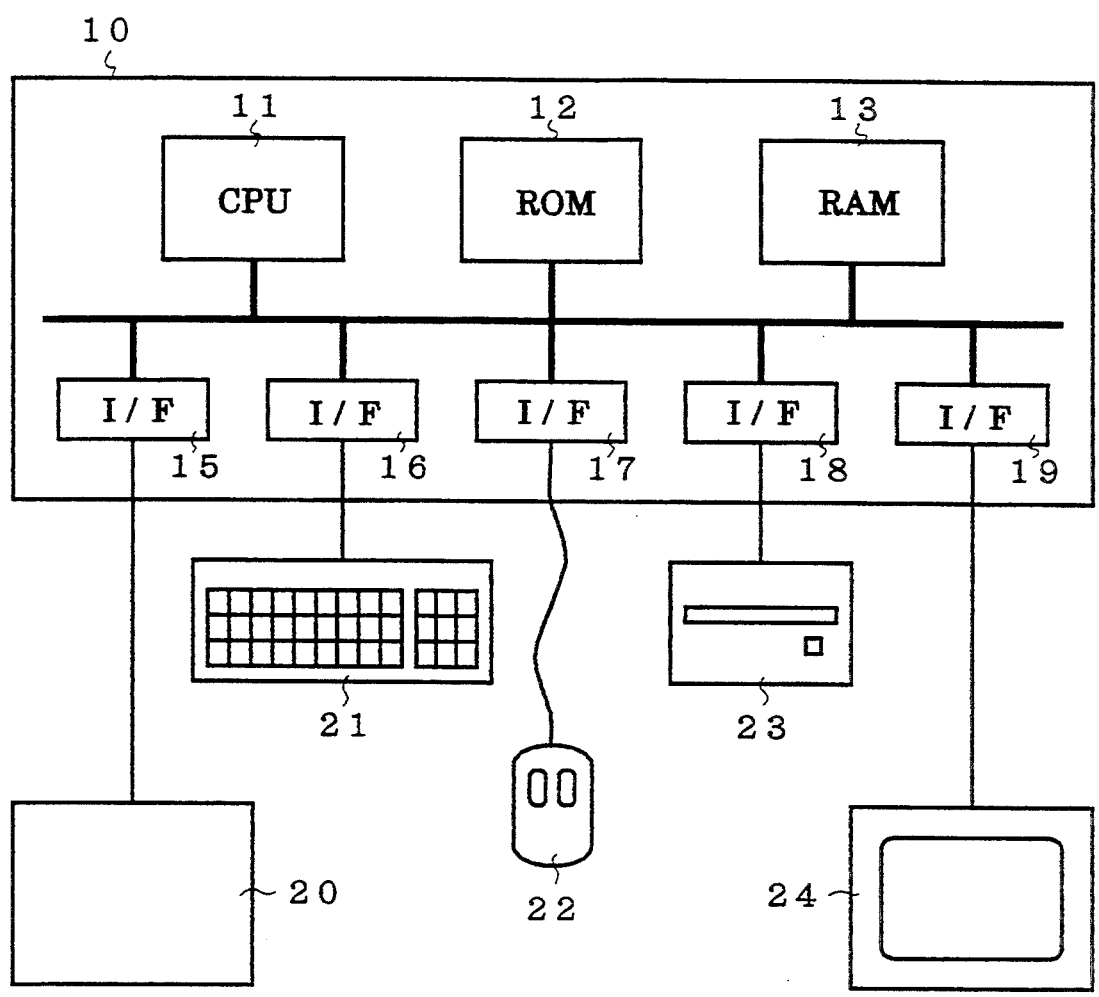
FIG. 5 is a block diagram of a data analyzer embodying the present invention.
Figure 6:
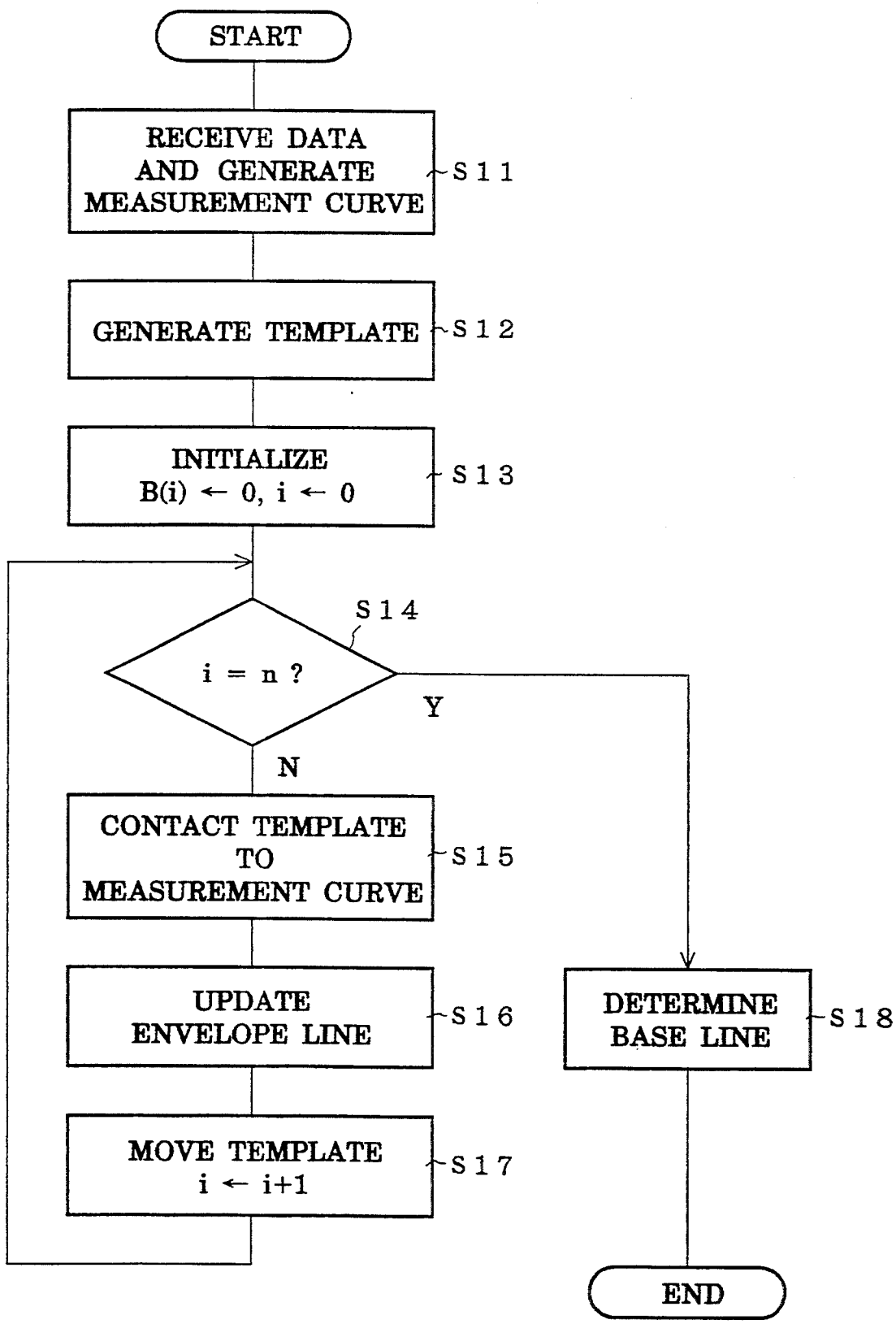
FIG. 6 is a flowchart of the program performed by the data analyzer of the embodiment.

A data analyzer embodying the present invention is described referring to FIGS. 1 through 9. As shown in FIG. 5, the data analyzer 10 is equipped with a microprocessor (CPU) 11, a read-only memory (ROM) 12, a random-access memory (RAM) 13 and several interface circuits (I/F) 15–19 for external devices including a keyboard 21, a mouse (or a joystick) 22, a disk memory device 23 and a display device 24. A measurement apparatus 20, such as a chromatograph or a spectrometer, is connected to the data analyzer 10 via an interface 15.

According to programs stored in the ROM 12 or loaded from the disk memory device 23 to the RAM 13, the CPU 11 of the data analyzer 10 realizes the respective elements M1–M4 of the block diagram of FIG. 4 and performs the process steps of the flowchart of FIG. 3. The process of determining the base line of a measurement curve by the data analyzer 10 is now described referring to the flowchart of FIG. 6.

First, the CPU 11 receives data from the measurement apparatus 20 and stores the data in a measurement data memory area provided in the RAM 13. Instead of receiving data from the measurement apparatus 20, it is possible to retrieve data previously stored in the disk memory device 23. Then the CPU 11 generates a measurement curve C and displays it on the display screen 24, as in FIG. 2, by plotting the data against an appropriate parameter (such as time, wavelength, etc.) used in the measurement (step S11). In this phase, the CPU 11 functions as the measurement curve generating means M1.

Figure 1:
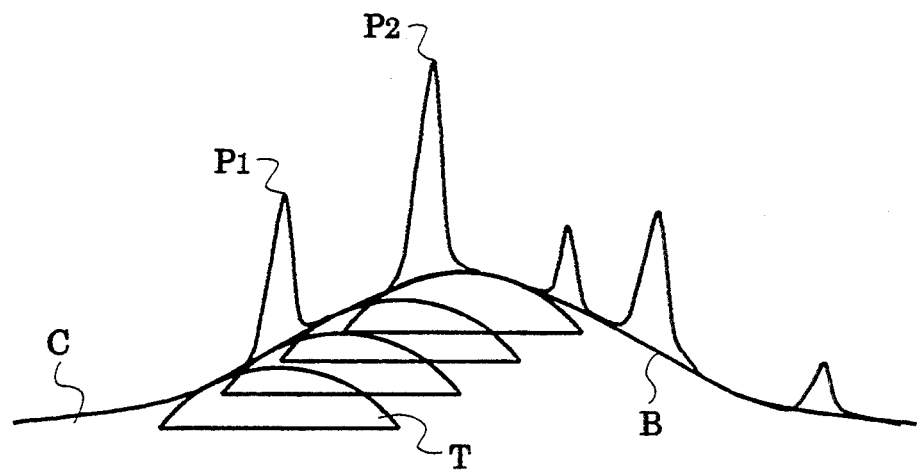
FIG. 1 is a diagram showing a template moved contacting a measurement curve.
Figure 2:
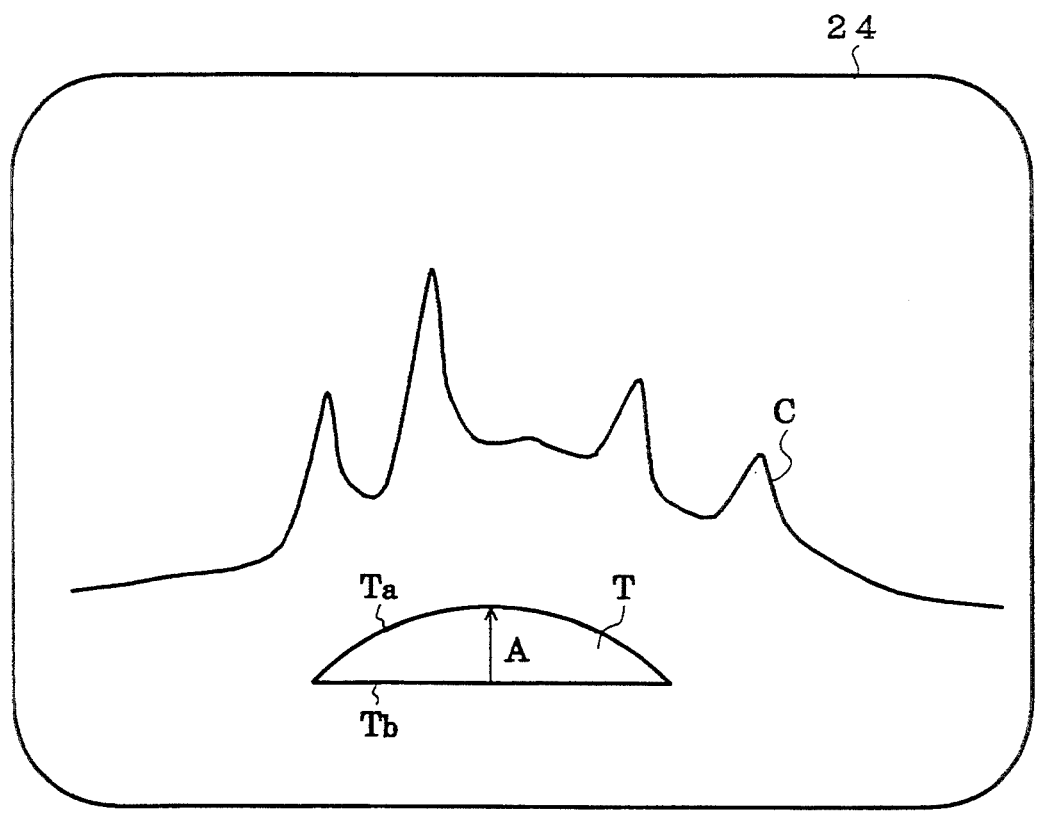
FIG. 2 shows a presentation of a display device of the embodiment.

Regarding the measurement curve C shown on the display screen 24, the operator of the data analyzer 10 gives the CPU 11 a parameter for generating a template T using the keyboard 21 (or the mouse or joystick 22) (step S12). In the present system, as shown in FIG. 2, the chord Tb of the template T is fixed at a preset length, and the arc Ta of the template T is presumed to be parabolic for simplicity. Thus, given the height A of the arc Ta as the parameter, the CPU 11 can generate a fixed shape of template T on the display screen 24. In this phase, the CPU 11 functions as the template generating means M2.

Before finally fixing the shape of the template T, the operator tentatively determines the shape of the template T. Then, moving the template T on the display screen 24 using the keyboard 21 or mouse 22, the operator applies the template T on the part of the measurement curve C having an ostensibly smallest curvature. By changing the value of the parameter A (height of the arc Ta) there, the operator determines the final value of the parameter A (or the final shape of the template T) as the smallest value of A with which the arc Ta of the template T does not cross the measurement curve C and contacts it at as many points as possible. It should be stressed here that this adjusting operation need not be so strict. Even if the height A is a little larger or smaller, there is little difference in the finally determined base line B. Therefore the burden of the operator for determining the parameter A is far less than the case for determining the non-apparent parameters in the conventional method.

Figure 9:
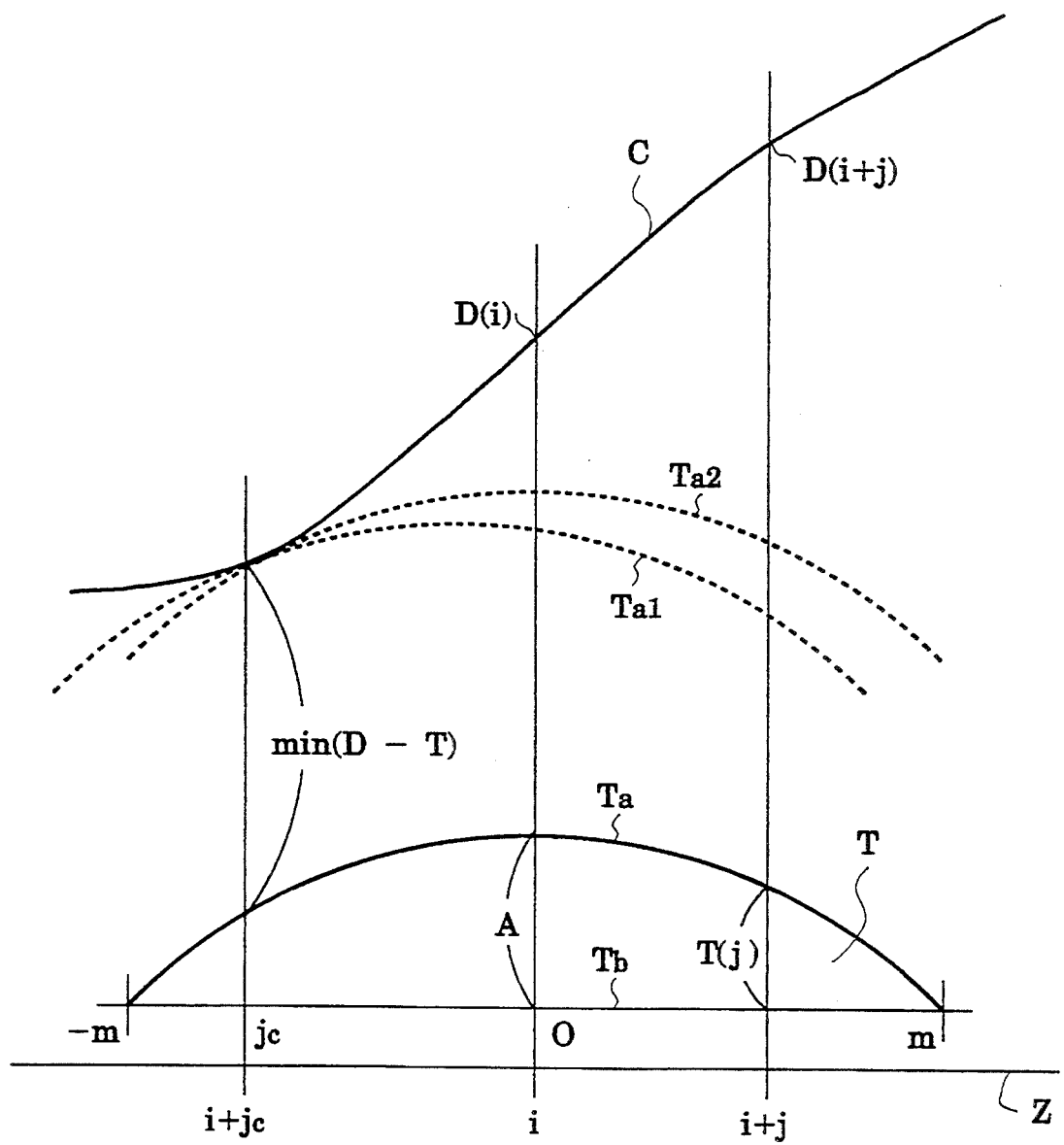
FIG. 9 is graph for explaining the geometry of the measurement curve and the template used in the embodiment.

The geometry of the measurement curve C and the template T is defined as in FIG. 9. The abscissa of the measurement curve C is denoted by the order i (i=0, 1, ..., n) of the sampling points of the measurement (here i corresponds to time, wavelength, etc.), and the height of the measurement curve C (i.e., the value of data) at a sampling point i is denoted as D(i). The height of the base line B is denoted as B(i). The template T is assigned its own coordinate system in which the unit length of the abscissa j is the same as that of i but the origin O is taken at the center of the chord Tb. The height of the arc Ta from the chord Tb at a point j is denoted as T(j) (j=−m, ..., 0, ..., m). Since the arc Ta is presumed parabolic, $$T(0)-T(j)=k \cdot j^2$$

where k is a constant. At either end of the chord Tb, i.e., at j=−m or j=m, $$T(m)=T(-m)=0,$$

and at the center O,
$T(0)=A$.
Then $$T(0)-T(m)=A=k \cdot m^2, \text{ or}$$

$$k=A/m^2$$

Thus $$T(j)=T(0)-k \cdot j^2 = A-(A/m^2) \cdot j^2 = A \cdot (1-j^2/m^2).$$

in the coordinate system (with the origin at the point O) of the template T. If the arc Ta of the template T is presumed to be circular, elliptic, etc., the CPU 11 uses other formulae than those used above, but there is no significant difference in the computing time for recent high-performance microprocessors.

When the final shape of the template T is determined by the operator (step S12), the CPU 11 calculates the values of T(j) (j=−m, ..., 0, ..., m) according to the equation above and stores the values in a template memory area provided in the RAM 13. Then the CPU 11 initializes the values B(i) (i=0, ..., n) of the envelope line (which finally becomes the base line B) stored in memory cells of a base line memory provided in the RAM 13 with the smallest possible value. The smallest possible value is assumed to be 0 in this case. Then the CPU 11 brings the template T to the starting point, i.e., brings the origin O of the template T to the sampling point i=0 (step S13).

After the initialization, the CPU 11 contacts the template T to the measurement curve C (step S15) at the sampling point i. The method of detecting the contact point is detailed later. When the template T is contacted to the measurement curve C, the CPU 11 updates the envelope line of the template T (step S16).

The method of updating the envelope line is also detailed later. After updating the envelope line, the CPU 11 moves the template T to the next sampling point i=1 (step S17) and repeats the same process (steps S15–S16) increasing the value of i (step S17) until i=n. The CPU 11 at steps S17 and S15 functions as the moving means M3, and at step S16 functions as the envelope generating means M4. When i reaches n (step S14), the final shape of the envelope line represents the base line B of the measurement curve C (step S18). After the base line B is determined, the data analyzer 10 processes the measurement data D(i) according to a preset program. For example, the true height of a peak P1, P2 is obtained by subtracting the value of the data by the height of the base line B at the same sampling point, and the area of a peak can be defined by the area surrounded by the measurement curve C and the base line B.

Figure 7:
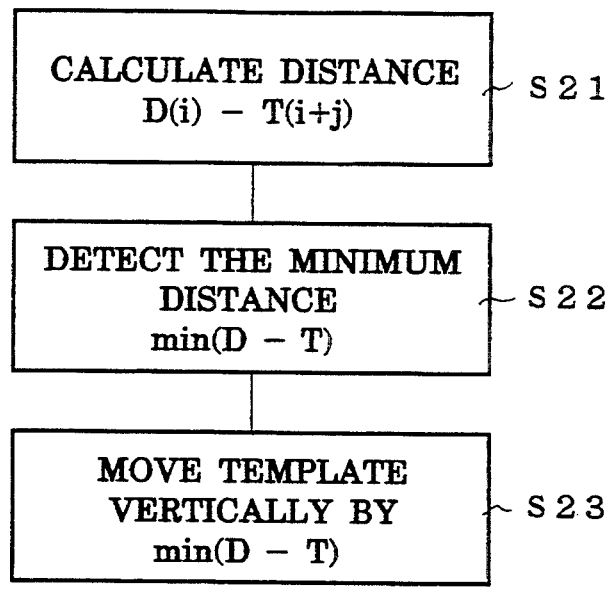
FIG. 7 is a flowchart of a subroutine of the program of FIG. 6.

The method of contacting the arc Ta of the template T to the measurement curve C is now explained referring to FIG. 7. Here, for simplicity, the chord Tb of the template T is assumed to be on the zero line Z of the measurement curve C (though they are shown separate in FIG. 9 for better visibility). The CPU 11 moves the template T horizontally and brings the origin O (j=0) to a pertinent sampling point i (step S17). Then the CPU 11 calculates the difference between the ordinate of the measurement curve D(i+j) and that T(j) of the arc Ta of the template T at the same abscissa (step S21). After calculating the distances between the measurement curve C and the arc Ta of the template T at every point of j=−m to j=m, the CPU 11 detects the point jc at which the distance [D(i+j)−T(j)] is the minimum (step S22). The point jc by the coordinate system of template T (or [i+jc] by the coordinate system of the measurement curve C) is the point at which the template T contacts the measurement curve C if the template T is moved vertically by the minimum distance min(D−T)=[D(i+jc)−T(jc)] at the sampling point i (step S23). The template T need not be actually moved vertically on the display screen 24, but it can be performed in the background.

Figure 8:
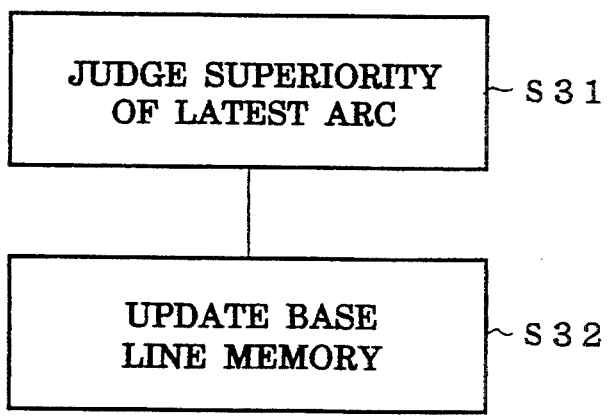
FIG. 8 is a flowchart of another subroutine of the program of FIG. 6.

The method of updating the envelope line is then explained referring to FIG. 8. As explained above, the arc Ta of the template T at the sampling point i−1 contacts the measurement curve C at the point

[i−1+jc1] if the template T is moved vertically by the distance [D(i−1+jc1)−T(jc1)]. When the template T is moved horizontally to the next sampling point i, it contacts the measurement curve C at a point [i+jc2] if moved vertically by the distance [D(i+jc2)−T(jc2)]. The arc Ta1 at the sampling point i−1 and the arc Ta2 at the sampling point i do not coincide (because the template T is moved horizontally), and there is a portion of the arc Ta2 that is superior to (above) the arc Ta1. The CPU 11 stores the ordinate T(j) of the portion of the arc Ta2 (that is superior to the arc Ta1) to the memory cell B(i) of the base line memory. The superiority of the arc Ta2 (or the latest arc) can be detected by comparing the value of the ordinate of the arc Ta2(j)=[T(j)+D(i+jc2)−T(jc2)] with the value in the corresponding memory cell B(i+j) (step S31). If [T(j)+D(i+jc2)−T(jc2)]>B(i+j), the data in the memory cell B(i) is updated to the new data Ta2(j)=[T(j)+D(i+jc2)−T(jc2)] (step S32). After the template T is moved from i=0 to t=n, the data in the memory cell B(i) (i=0, 1, . . . , n) represent the envelope of the template T thus moved, which is the base line B of the measurement curve C.

What is claimed is:

1. A method for determining a base line of a measurement curve using a data analyzer having a CPU, a ROM, a RAM and a plurality of interface circuits, the method comprising the steps of:
   preparing, with said CPU, a template having an arc upward convex so that a radius of curvature of the arc is smaller than an ostensibly smallest radius of curvature of the base line;
   moving, without rotating, with said CPU, the template along the measurement curve between a plurality of sampling points with a point on the arc of the template always contacting the measurement curve, said point being determined in accordance with distances between said arc and said base line at each of said sampling points;
   initializing data of the base line by designating a smallest value of the base line as a starting sampling point;
   judging whether points of the arc of the template after being moved to a next sampling point are superior to points of the arc at a previous sampling point at every point of the arc; and
   updating data of the base line from said previous sampling point at the points where the arc after being moved to said next sampling point is superior to the points of the arc at said previous sampling point by the data of the arc after being moved to said next sampling point.

2. The method for determining a base line of a measurement curve according to claim 1, where the template moving step comprises the steps of:
   moving the template horizontally under the measurement curve;
   calculating, at the given horizontal position of the template, the vertical distance between the arc of the template and the measurement curve at every point of the arc of the template;
   detecting the minimum of the vertical distance; and
   moving the template vertically at the given horizontal position by the minimum vertical distance.

3. The method for determining a base line of a measurement curve according to claim 1, where the arc of the template is parabolic.

4. The method for determining a base line of a measurement curve according to claim 1, where the arc of the template is circular.

5. The method for determining a base line of a measurement curve according to claim 1, where the arc of the template is elliptic.

6. A data processing apparatus for determining a base line of a measurement curve comprising:
   measurement curve generating means;
   template generating means for generating a template having an arc upward convex so that a radius of curvature of the arc is smaller than an ostensibly smallest radius of curvature of the base line;
   moving means for moving, without rotating, the template along the measurement curve between a plurality of sampling points so that a point on the arc of the template always contacts the measurement curve, said point being determined in accordance with distances between said arc and said base line at each of said sampling points;
   a base line memory composed of a plurality of memory cells each for storing data of every point of the base line;
   superiority judging means for judging whether points of the arc of the template after being moved to a next sampling point by the moving means are superior to points of the arc at a previous sampling point at every point of the arc; and
   updating means for updating data of the base line from said previous sampling point in the memory cell of the base line memory corresponding to the points where the arc after being moved to said next sampling point is superior to the points of the arc at said previous sampling point by the data of the arc after being moved to said next sampling point.

7. The data processing apparatus according to claim 6, where the moving means comprises:
   horizontal moving means for moving the template horizontally under the measurement curve;
   distance calculating means for calculating, at a given horizontal position of the template, the vertical distance between the arc of the template and the measurement curve at every point of the arc of the template;
   minimum detecting means for detecting the minimum of the vertical distance; and
   vertical moving means for moving the template vertically at the given horizontal position by the minimum vertical distance.

8. The data processing apparatus according to claim 6, where the arc of the template is parabolic.

9. The data processing apparatus according to claim 6, where the arc of the template is circular.

10. The data processing apparatus according to claim 6, where the arc of the template is elliptic.

* * * * *

UNITED STATES PATENT AND TRADEMARK OFFICE
CERTIFICATE OF CORRECTION

PATENT NO. : 5,442,574

DATED : August 15, 1995

INVENTOR(S) : Kazunari Shinya

It is certified that error appears in the above-identified patent and that said Letters Patent is hereby corrected as shown below:

IN THE TITLE:

On the title page, item [54] and column 1, should read

-- METHOD AND APPARATUS FOR DETERMINING A BASE LINE OF A MEASUREMENT CURVE --

Signed and Sealed this

Twelfth Day of December, 1995

Attest:

BRUCE LEHMAN

Attesting Officer

Commissioner of Patents and Trademarks